United States Patent [19]
Kaga et al.

[11] Patent Number: 5,228,124
[45] Date of Patent: Jul. 13, 1993

[54] COORDINATE READER

[75] Inventors: Ichiki Kaga; Tatsuyoshi Ikuta; Hiroyuki Furuichi; Shuzo Matsumoto; Tetsuya Iwanaga, all of Tokyo, Japan

[73] Assignee: Mutoh Industries, Ltd., Tokyo, Japan

[21] Appl. No.: 800,729

[22] Filed: Dec. 3, 1991

Related U.S. Application Data

[63] Continuation of Ser. No. 436,793, Nov. 15, 1989, abandoned.

Foreign Application Priority Data

Mar. 22, 1989 [JP] Japan .................................... 1-69990

[51] Int. Cl.⁵ ............................................ G06F 15/60
[52] U.S. Cl. .................................... 395/161; 395/141; 340/706; 340/710
[58] Field of Search ................................ 395/111–112, 395/127; 340/706–712; 382/58, 59; 178/19; 250/211; 369/200

[56] References Cited

U.S. PATENT DOCUMENTS

| | | | |
|---|---|---|---|
| 4,686,332 | 8/1987 | Greanias et al. | 178/19 |
| 5,047,754 | 9/1991 | Akatsuka et al. | 340/709 |

Primary Examiner—Gary V. Harkom
Assistant Examiner—Almis Jankos
Attorney, Agent, or Firm—Wenderoth, Lind & Ponack

[57] ABSTRACT

In a reader in which a tablet and a cursor device are connected electrically to the reader and an indicated position of the cursor device on the tablet is converted to a coordinate signal to be outputted, the improved reader in which two cursor devices are connected to the reader, and the first cursor device is retained by one hand, and the second cursor device is retained by the other hand, and the two cursor devices are manipulated by both hands of the operator so as to shift them on the tablet whereby the reader outputs the coordinate signal for the drawing of a graphic, and setting the command to a CPU on the basis of the indication of each cursor device.

4 Claims, 4 Drawing Sheets

COORDINATE READER

This application is a continuation of now abandoned application, Ser. No. 07/436,793 filed on Nov. 15, 1989.

BACKGROUND OF THE INVENTION

This invention relates to a tablet type coordinate reader for use as input equipment for computer aided design.

Heretofore, as the object of use of the tablet, the input or reading of coordinates of graphics and the like, is the primary object, and a cursor device with a button has been used for the input or the reading of the coordinates. In recent years, there are many cases where small size tablets are used as the auxiliary input equipment of a computer and the like whose primary object is the receiving of an input from a keyboard, but in this case, the menu sheet is pasted on the tablet or the pointing device for indicating the menu or the command is on the display screen, in most cases, the operation is carried out by using either the cursor device with a button or the stylus pen and the like.

However, in a large size tablet, there were drawbacks in that it was inconvenient for an operator to use the one cursor device by one hand manipulation, and also, the efficiency was not satisfactory.

SUMMARY OF THE INVENTION

An object of this invention is to solve the foregoing problems.

This object may be effected by providing an apparatus comprising:

a coordinate reader;

a tablet;

two cursor devices moveably disposed on said tablet and electrically connected to said coordinate reader such that said coordinate reader transforms physical position indication signals of said two cursor devices on said tablet into X-Y coordinate signals;

a CPU connected to said coordinate reader for receiving said X-Y coordinate signals output from said coordinate reader;

a switch electrically disposed between said two cursors and said coordinate reader for alternatively supplying said physical position indication signals of said two cursor devices to said coordinate reader in response to control signals generated by said CPU; and a timer connected to said CPU for controlling the timing of the changeover of said switch by said CPU.

BRIEF DESCRIPTION OF THE DRAWING FIGURES

DESCRIPTION OF THE PREFERRED EMBODIMENT

The construction of this invention will be described in the following in detail by referring to embodiments illustrated on attached drawings.

Figure 5:
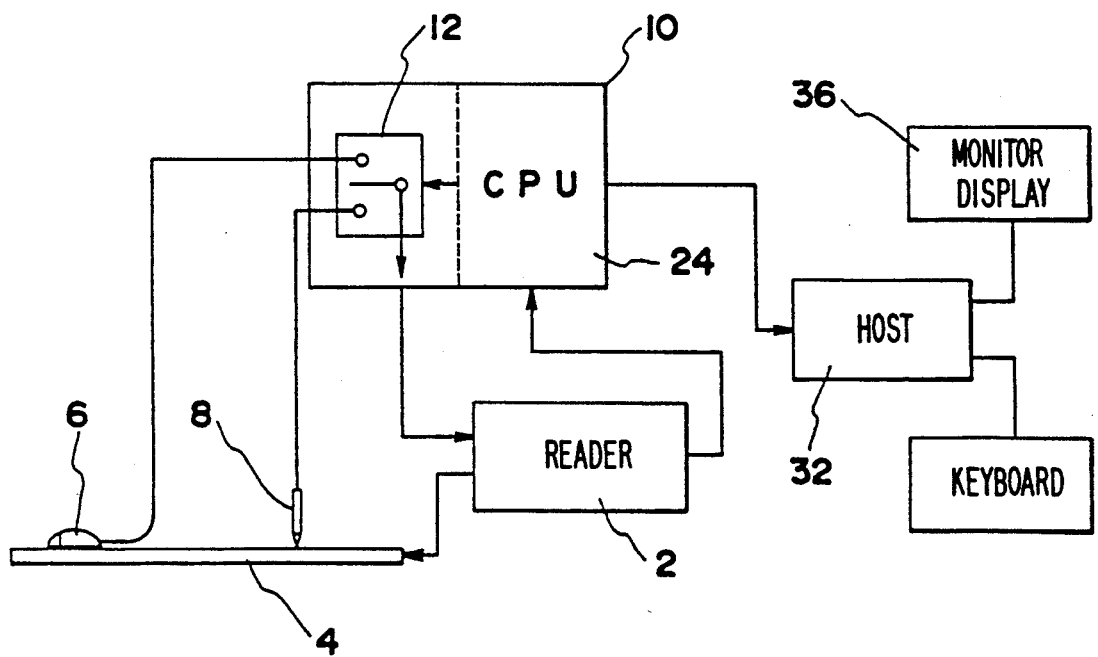
FIG. 5 is an explanatory block diagram depicting roughly the whole structure of the present invention.
Figure 6:
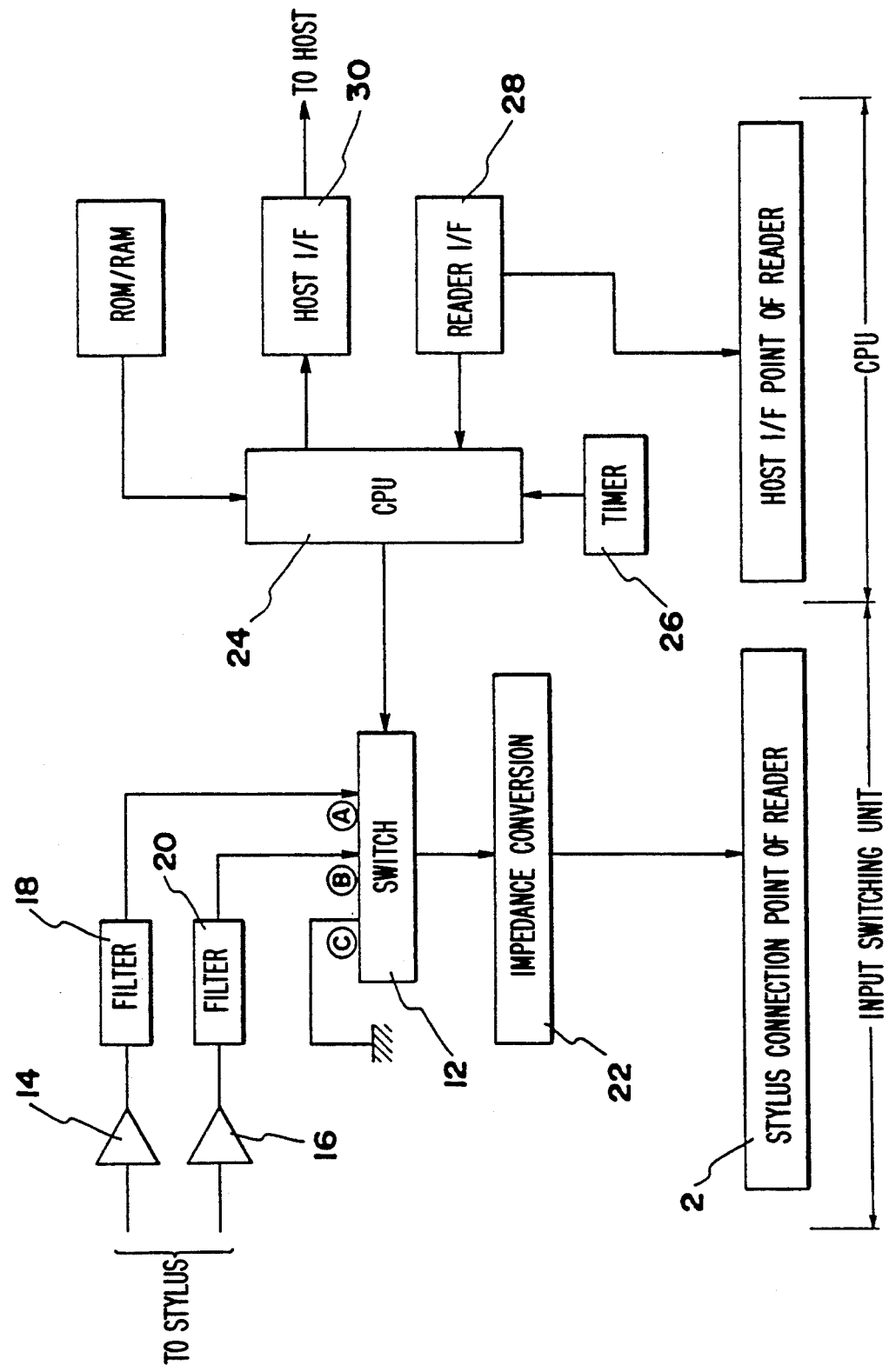
FIG. 6 is an explanatory block diagram depicting the relationship between an input changeover device and a CPU for controlling the changeover device.

In FIG. 5, element 2 is a reader of a known tablet type coordinate digitizer which reads and outputs a position of a cursor device on a tablet 4 as an XY coordinate signal on the basis of an output signal from the cursor device. In this reader, two cursor devices 6 and 8 are each connected to a reader 2 by means of an input switching unit 12 of a 2 coordinator 10 which is divided to an input changing unit and a CPU unit as shown in FIG. 6. The input changing unit detects the signals from the cursor devices 6 and 8 and amplifies them with amplifiers 14 and 16, and shapes them with filters 18 and 20 and transmits the signals outputted from an input switching unit 12 to a connection point of the cursor device of the reader 2 by passing them through an impedance converter 22. In a CPU 24, a switching timing of the input switching unit 12 is controlled by a timer 26 and the data transmitted from an interface 28 of the reader 2 is digitized by matching with the timing to discriminate the coordinates of either of the cursor devices 6 and 8, and selection flags of the signals A and B are added, and the data is transmitted to a host computer 32 by means of an interface 30. The input C to the input switching unit 12 is used for preventing the reading of erroneous coordinates during the switching of the signals A and B whereby the switching is carried out in the order of A, C, B, C, A . . . As the cursor device 6, a cursor with a button or an exclusive device to be described hereinafter is used. As the cursor device 8, a stylus pen is used.

Next, an operation of the embodiment will be described.

Figure 1:
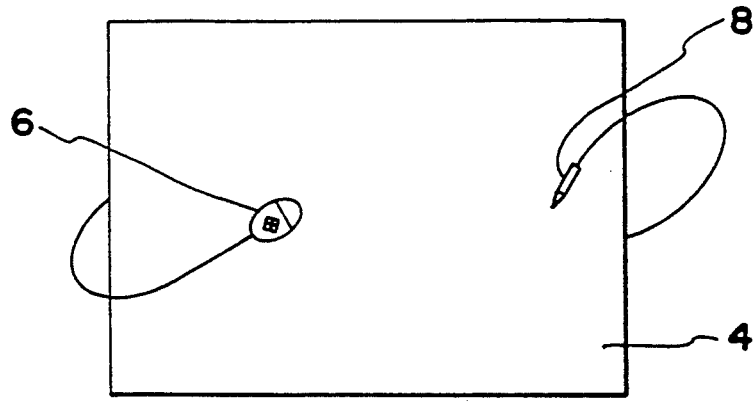
FIG. 1 is a plan view of one embodiment of the present invention of a tablet provided with two cursor devices.
Figure 2:
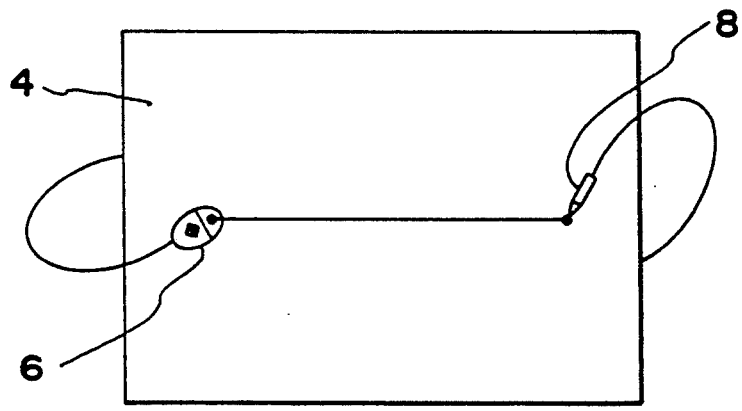
FIG. 2 is a plan view of the tablet of the embodiment shown in FIG. 1, showing the operation of the two cursor devices indicating two points on a straight line.
Figure 3:
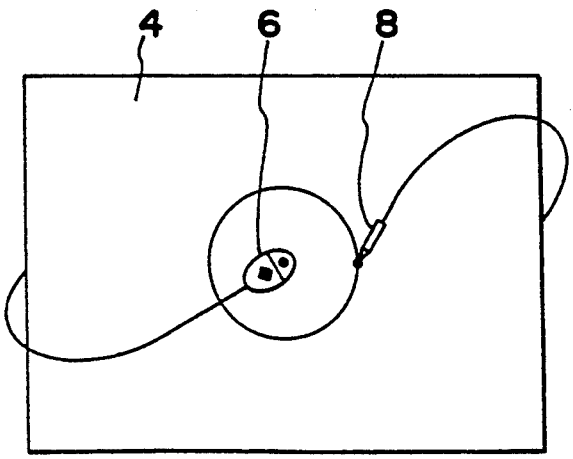
FIG. 3 is a plan view of the tablet of the embodiment shown in FIG. 1, showing the operation of the two cursor devices indicating a center point of a circle and a radius.
Figure 4:
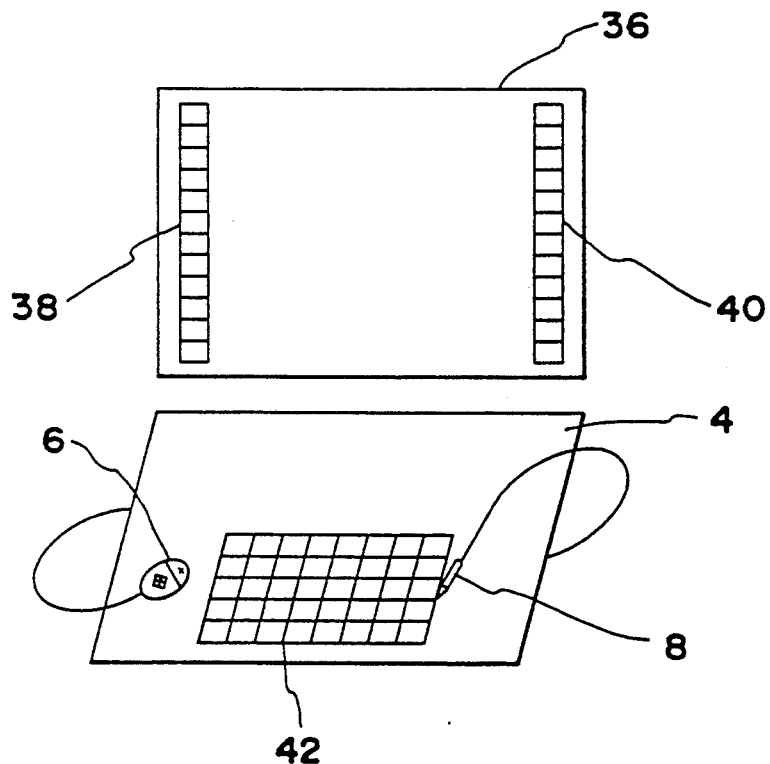
FIG. 4 is an explanation view of the operation of two cursor devices according to an embodiment of the present invention, in which a command menu dispalyed is indicated on the tablet.
Figure 7:
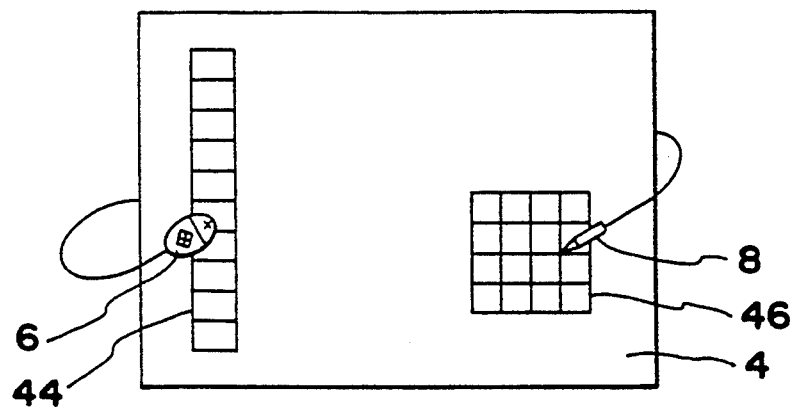
FIG. 7 is a plan view of the tablet in accordance with an embodiment of the present invention, which depicts operation for indicating the menu sheet on the tablet by means of two cursor devices.
Figure 8:
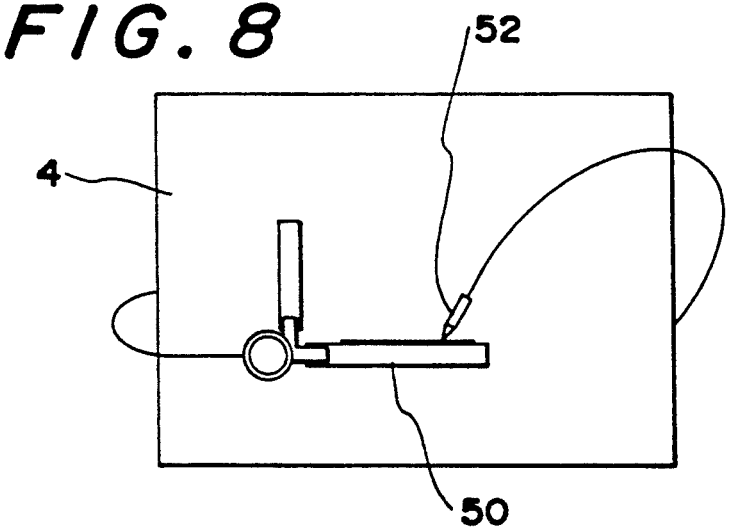
FIG. 8 is a plan view of the tablet in accordance with another embodiment of the present invention showing an operation of a straight ruler type cursor device and a stylus pen.
Figure 9:
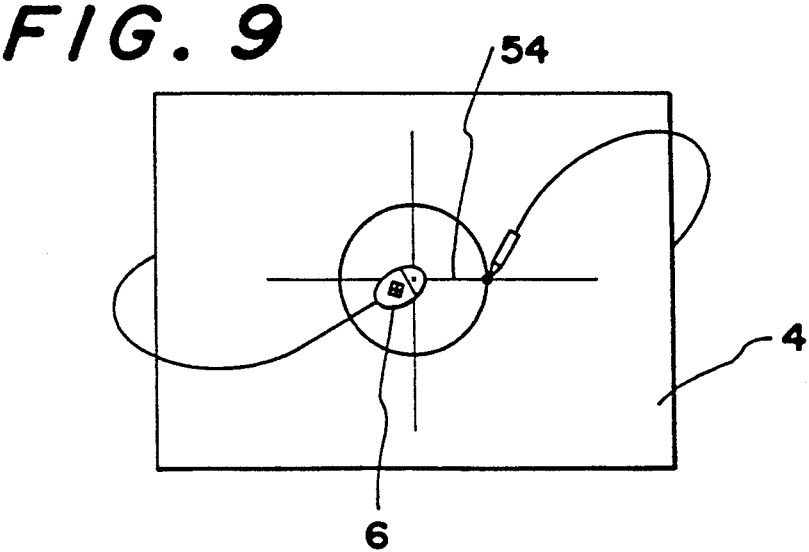
FIG. 9 is a plan view of the tablet in accordance with another embodiment of the present invention, depicting an operation in which operation scenes on the display are projected on the tablet, a straight ruler image projected on the tablet is moved by single cursor device, and a desired point on the pattern is indicated by another cursor device.

On the tablet 4, when the input of the graphic is carried out, in case of a straight line, a indication of two points, namely, a start point and a final point are required in the least. Also, in the case of a circle, circular arc, or ellipse, elliptical arc, free curve, an indication of plural points is required. An operator manipulates the two cursor devices 6 and 8 with both hands of the operator on the tablet 4 to perform the indication of the plural points as shown in FIG. 2 and FIG. 3, and draws the straight line, circular arc and the like on a host computer 32. It is similar in the indication of the pick up such as a command menu and the like, and menus 38 and 40 as shown on the screen of a monitor display 36 are handled by manipulating the cursor devices 6 and 8 to input the command as shown in FIG. 4. Also, as shown in FIG. 4, a menu sheet 42 on the tablet 4 and the menus 38 and 40 displayed on the screen of the monitor display 36 are handled by manipulating the two cursor devices 6 and 8 with both hands of the operator to input the command. Furthermore, as shown in FIG. 7, menu sheets 44 and 46 are handled on the tablet 4 by manipulating the two cursor devices 6 and 8 with both hands of the operator to input command. In FIG. 7, the screen of the display is enlarged and projected on the transparent tablet 4, and a coordinate standard of this enlarged projected drawing and a coordinate standard of the tablet 4 correspond with each other with a 1:1 relationship. FIG. 8 shows another embodiment, wherein a straightedge 50 that is the exclusive cursor device is handled by left hand of the operator, and an original point of the ruler is set as a relative coordinate start point, and a line is drawn by tracing the straightedge 50 with a stylus pen 52 retained by the right hand of the operator. Also, as shown in FIG. 9, the screen of the display is projected on the transparent tablet by means of an enlarging projecting mechanism, and a straightedge 54 on the screen to be displayed on the tablet 4 may be manipulated by the cursor device 6 retained by the left hand of the operator. A coordnate standard of the enlarged projected drawing of the screen and a coordinate standard of the tablet correspond with each other with a 1:1 relationship.

This invention is constructed as described in the foregoing, and thus, the indication of the command and the drawing of the graphic can be performed efficiently by manipulating the two cursor devices with both hands of the operator on the tablet, and more particularly, in the case where two points which are greatly separated on the large size digitizer must be indicated, this invention is convenient whereby the foregoing effects can be brought about by this invention.

What is claimed is:

1. A display apparatus comprising:

a display screen for displaying an original image on a display screen surface thereof, said display screen surface having an X-axis dimension and a Y-axis dimension which is perpendicular to the X-axis dimension, wherein locations on said display screen surface are defined by corresponding X-axis and Y-axis coordinates;

a generally flat transparent tablet having an image projection surface having an X-axis dimension and a Y-axis direction which is perpendicular to the X-axis direction, wherein locations on said image projection surface are defined by corresponding X-axis and Y-axis coordinates;

means for enlarging said original image displayed on said display screen and projecting the thus enlarged image from said image projection surface of said transparent tablet, wherein there is a one-to-one correspondence of said X-axis and Y-axis coordinates defining locations on said display screen surface and said X-axis and Y-axis coordinates defining locations on said image projection surface, and wherein a location of said original image is defined by X-axis and Y-axis coordinates of said display screen surface which correspond to the X-axis and Y-axis coordinates of said image projection surface that define the location of said enlarged image;

first and second cursor devices for respectively generating electric signals when placed in contact with said image projection surface of said transparent tablet;

a reading means, operatively coupled to said transparent tablet, for receiving said electric signals and for determining the X-axis and Y-axis coordinates of said image projection surface at which a one of said first and second cursor devices operatively coupled to said reading means is placed in contact with said image projection surface, said reading means further for generating a position signal denoting the thus determined X-axis and Y-axis coordinates of said image projection surface;

a switch means for selectively operatively coupling either one of said first and second cursor devices to said reading means;

a central processing unit, operatively coupled to said reading means and said switch means, for receiving said position signal from said reading means and for controlling a switching operation of said switch means; and, a timer, operatively coupled to said central processing unit, for establishing a timing of the switching operation of said switch means controlled by said central processing unit.

2. A display apparatus as recited in claim 1, wherein said first cursor device includes first and second straight edge members which are perpendicular to each other, and said second cursor device includes an elongated pen member having a stylus at one end thereof.

3. A display apparatus as recited in claim 2, wherein said central processing unit is further for causing an image to be displayed on said display screen corresponding to locations on said transparent tablet at which said first and second cursors are placed in contact therewith.

4. A display apparatus as recited in claim 1, wherein said central processing unit is further for causing an image to be displayed on said display screen corresponding to locations on said transparent tablet at which said first and second cursors are placed in contact therewith.

* * * * *